(12) United States Patent
Hiraki et al.

(10) Patent No.: US 9,471,123 B2
(45) Date of Patent: Oct. 18, 2016

(54) REDUCING UNNECESSARY POWER CONSUMED BY PERIPHERAL DEVICES WHILE DISPLAYING A MOVING IMAGE

(71) Applicant: FUJITSU LIMITED, Kawasaki-shi, Kanagawa (JP)

(72) Inventors: Tetsuo Hiraki, Kawasaki (JP); Hiromasa Yamauchi, Usakos (JP); Koichiro Yamashita, Hachioji (JP); Fumihiko Hayakawa, Kawasaki (JP); Naoki Odate, Akiruno (JP); Takahisa Suzuki, Yokohama (JP); Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 14/213,646

(22) Filed: Mar. 14, 2014

(65) Prior Publication Data

US 2014/0201546 A1    Jul. 17, 2014

Related U.S. Application Data

(63) Continuation of application No. PCT/JP2011/071153, filed on Sep. 15, 2011.

(51) Int. Cl.
*G06F 1/26* (2006.01)
*G06F 1/32* (2006.01)
(Continued)

(52) U.S. Cl.
CPC ............ *G06F 1/266* (2013.01); *G06F 1/3228* (2013.01); *G06F 1/3265* (2013.01); *H04M 1/72561* (2013.01); *H04W 52/0251* (2013.01); *Y02B 60/1242* (2013.01)

(58) Field of Classification Search
CPC .. G06F 1/3203; G06F 1/3287; G06F 1/3243; H04N 9/87
USPC ......................................................... 713/310
See application file for complete search history.

(56) References Cited

U.S. PATENT DOCUMENTS 5,928,365 A * 7/1999 Yoshida ................ G06F 1/3225
365/222

(Continued)

FOREIGN PATENT DOCUMENTS

| JP | 2001-056728 A | 2/2001 |
| JP | 2005-252375 A | 9/2005 |

(Continued)

OTHER PUBLICATIONS

Japanese Office Action issued on Mar. 17, 2015; Japanese Application No. 2013-533420.

(Continued)

*Primary Examiner* — Thomas Lee
*Assistant Examiner* — Santosh R Poudel
(74) *Attorney, Agent, or Firm* — Arent Fox LLP

(57) ABSTRACT

A power supply control method includes detecting that a result of a first function performed by a first device ceases to be displayed on a display screen; suspending power supply to the first device and supplying power to a second device, based on a detection of the result ceasing to be displayed; and causing the second device to output a response signal to a CPU in response to a control signal from the CPU.

9 Claims, 12 Drawing Sheets

(51) Int. Cl.
*H04M 1/725* (2006.01)
*H04W 52/02* (2009.01)

(56) References Cited

U.S. PATENT DOCUMENTS

| | | | | |
|---|---|---|---|---|
| 7,120,162 | B1* | 10/2006 | Katibian | H04W 28/14 370/431 |
| 7,466,316 | B1* | 12/2008 | Alben | G06F 9/5044 345/501 |
| 2003/0080964 | A1* | 5/2003 | Prache | H04N 13/026 345/531 |
| 2005/0191028 | A1 | 9/2005 | Matsuda et al. | |
| 2007/0088966 | A1* | 4/2007 | Price | G06F 1/3203 713/324 |
| 2007/0229462 | A1* | 10/2007 | Huynh | A63F 13/10 345/169 |
| 2008/0250161 | A1* | 10/2008 | Onozawa | G09G 5/006 710/5 |
| 2009/0049312 | A1* | 2/2009 | Min | G06F 1/3228 713/300 |
| 2009/0106687 | A1* | 4/2009 | De Souza Sana | G06F 3/0481 715/784 |
| 2009/0256917 | A1* | 10/2009 | Lin | H04N 5/232 348/207.11 |
| 2010/0039566 | A1* | 2/2010 | Kim | G09G 5/005 348/705 |
| 2010/0100696 | A1 | 4/2010 | Suzuki | |
| 2010/0328331 | A1* | 12/2010 | Iwaki | G09G 3/003 345/547 |
| 2011/0191666 | A1* | 8/2011 | Decker | G06F 3/14 715/234 |
| 2011/0202847 | A1* | 8/2011 | Dimitrov | G06F 3/0481 715/738 |
| 2012/0139929 | A1* | 6/2012 | Kaza | G06T 13/00 345/522 |
| 2013/0132759 | A1* | 5/2013 | Lathrop | G06F 11/3062 713/340 |
| 2013/0343733 | A1* | 12/2013 | Zhao | H04N 9/87 386/353 |
| 2015/0193547 | A1* | 7/2015 | Burkard | G06F 17/30902 709/203 |

FOREIGN PATENT DOCUMENTS

| | | |
|---|---|---|
| JP | 2006-157595 A | 6/2006 |
| JP | 2007-108993 A | 4/2007 |
| JP | 2010-097533 A | 4/2010 |
| JP | 2011-059226 A | 3/2011 |

OTHER PUBLICATIONS

Search Report issued in International Patent Application No. PCT/JP2011/071153 mailed Nov. 29, 2011, 2 pages.

* cited by examiner

FIG.5

| | CORRESPOND-ENCE TABLE 500 | |
|---|---|---|
| | APP ID | PERIPHERAL ID |
| 500-1 | A1 | P1 |
| 500-2 | A2 | P1, P2 |
| ⋮ | ⋮ | ⋮ |
| 500-k | Ak | Pj |
| ⋮ | ⋮ | ⋮ |
| 500-K | AK | ... |

FIG.6

PERIPHERAL DB 600

| | PERIPHERAL ID | DELAY INFORMATION | CHANNEL INFORMATION | CONTROL REGISTER INFORMATION |
|---|---|---|---|---|
| 600-1 | P1 | D1 | C1 | R1 |
| 600-2 | P2 | D2 | C2 | R2 |
| ⋮ | ⋮ | ⋮ | ⋮ | ⋮ |
| 600-j | Pj | Dj | Cj | Rj |
| ⋮ | ⋮ | ⋮ | ⋮ | ⋮ |
| 600-m | Pm | Dm | Cm | Rm |

REDUCING UNNECESSARY POWER CONSUMED BY PERIPHERAL DEVICES WHILE DISPLAYING A MOVING IMAGE

CROSS REFERENCE TO RELATED APPLICATIONS

This application is a continuation application of International Application PCT/JP2011/071153, filed on Sep. 15, 2011 and designating the U.S., the entire contents of which are incorporated herein by reference.

FIELD

The embodiments discussed herein are related to a power supply control method and system that control power supply.

BACKGROUND

Some portable terminals, such as cellular phones and smart phones, are equipped with peripheral equipment that assumes a task in place of a central processing unit (CPU). For example, a portable terminal is known that is equipped with a video decoder accelerator, which assumes a task related to moving images in place of the CPU.

Several related techniques are known. For example, according to one technique, when an application is transferred in a computer system, the power supply of a transfer-destination computer is turned on during a period between the end of the copying of data stored in a transfer origin logical volume and the end of the copying of data that differs. According to another technique, when the power supply of a digital broadcasting receiver is turned on and before parameters included in the broadcasted data are obtained, an initialization process is executed using parameters obtained at the previous reception of data.

For examples of such techniques, refer to Japanese Laid-Open Patent Publication Nos. 2010-97533 and 2006-157595.

The conventional techniques, however, pose a problem that excessive operations by peripheral equipment incorporated in a portable terminal, etc., leads to an increase in consumption power. For example, a case is assumed where a Web page having a moving image is viewed and consequent to a scrolling of the contents displayed on the screen, the moving image is no longer displayed on the screen. In this case, if the operation for processing the moving image is continued by the peripheral equipment, a problem arises in that power is consumed for processing a moving image that is not displayed on the display screen.

SUMMARY

According to an aspect of an embodiment, a power supply control method includes detecting that a result of a first function performed by a first device ceases to be displayed on a display screen; suspending power supply to the first device and supplying power to a second device, based on a detection of the result ceasing to be displayed; and causing the second device to output a response signal to a CPU in response to a control signal from the CPU.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of an example of the contents of a correspondence table 500;

FIG. 6 is an explanatory view of an example of the contents of a peripheral database (DB) 600;

DESCRIPTION OF EMBODIMENTS

An embodiment of a power supply control method and a system will be described in detail with reference to the accompanying drawings.

Figure 1:
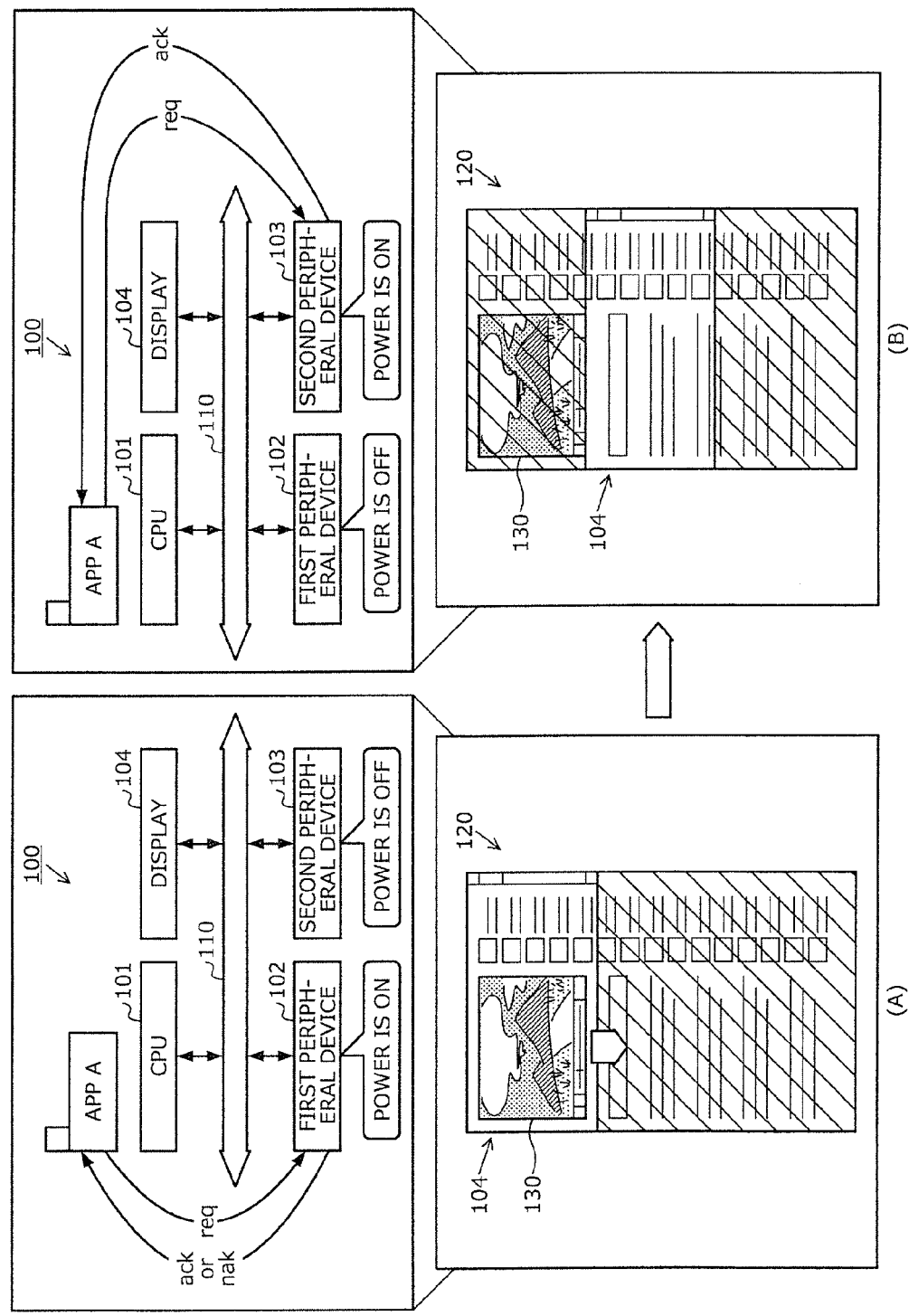
FIGS. 1 and 2 are explanatory diagrams of examples of a power supply control method according to an embodiment.
Figure 2:
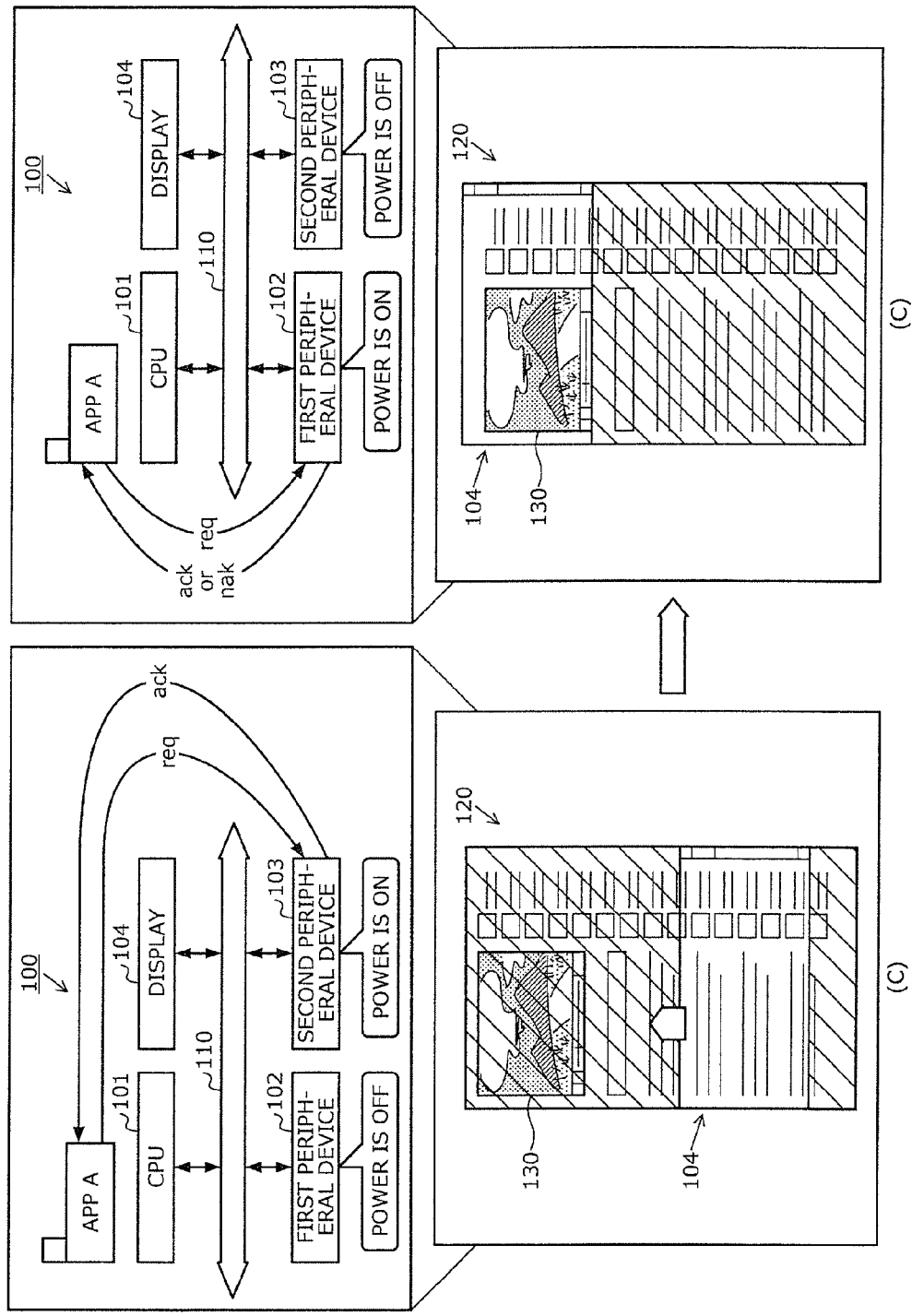

FIGS. 1 and 2 are explanatory diagrams of examples of a power supply control method according to an embodiment. In FIG. 1, a system 100 includes a CPU 101, a first peripheral device 102, a second peripheral device 103, and a display 104. In the system 100, the CPU 101, the first peripheral device 102, the second peripheral device 103, and the display 104 are interconnected through a bus 110.

The CPU 101 supervises overall control of the system 100. The CPU 101 executes an application (which may also be referred to simply as "app"). The first peripheral device 102 is hardware that realizes a given function. The first peripheral device 102 is provided as, for example, a video decoder accelerator, sound decoder accelerator, etc.

Upon receiving a control signal from the CPU 101, the second peripheral device 102 executes a task related to the given function. The control signal from the CPU 101 is, for example, a task request ("req" in FIG. 1) for the task related to the given function and is from an app under execution to the first peripheral device 102. The given function is, for example, a function of reproducing a moving image (still images switched at arbitrary intervals are also regarded as a moving image) or a function of reproducing sounds. The task related to the given function is, for example, moving image processing or sound processing.

The first peripheral device 102 transmits to the CPU 101, a response signal in response to the control signal from the CPU 101. For example, when having normally executed the task related to the given function, the first peripheral device 102 transmits an ack signal to the CPU 101. When having failed to execute the task related to the given function, the first peripheral device 102 transmits a nak signal to the CPU 101.

The second peripheral device 103 is hardware that responds to a control signal from the CPU 101 by the same method as the response method of the first peripheral device 102. The control signal from the CPU 101 is, for example, the above task request that the app under execution makes to the first peripheral device 102. For example, in response to the control signal from the CPU 101, the second peripheral device 103 transmits to the CPU 101, an ack signal indicating normal completion of the task related to the given function.

This means that the second peripheral device 103 responds to the control signal from the CPU 101 but does not execute the task related to the given function (e.g., image processing). As a result, the second peripheral device 103 consumes less power than the first peripheral device 102 does. The display 104 is hardware that displays data of documents, images, functional information, etc.

A case is assumed where an app A is run by the CPU 101 in the system 100. The app A is, for example, a Web browser (plug-in software of the Web browser) for viewing a Web page. The first peripheral device 102 is hardware that is used when the app A is executed. For example, the first peripheral device 102 is a video decoder accelerator that processes moving images included in a Web page.

In the state depicted by (A) in FIG. 1, a Web page 120 is displayed on the display 104. Furthermore, the image size of the Web page 120 as a whole is larger than the display size of the display 104. As a result, a part of the Web page 120 including a moving image reproduction screen 130 is displayed on the display 104.

The moving image reproduction screen 130 represents a display area on the Web page 120 in which a moving image processed by the first peripheral device 102 is displayed. A user, for example, operates an input device (not depicted) to scroll the contents displayed on the display 104 and thereby, views the entire Web page 120.

According to the embodiment, when the moving image reproduction screen 130 is scrolled out of the display 104, power supply to the first peripheral device 102 is suspended and the operation of the first peripheral device 102 emulated by the second peripheral device 103 and second peripheral device 103 returns to the app A, the same response returned to the app A by the first peripheral device 102. An example of a power supply control process by the system 100 will hereinafter be described.

(1) The CPU 101 detects that the results of a given function performed by the first peripheral device 102 are no longer being displayed on the display screen. In this example, the given function is a function of reproducing (decoding for) a moving image. For example, the CPU 101 detects that the moving image reproduction screen 130 is no longer displayed on the display 104.

In the example depicted in FIG. 1, as a result of scrolling (down) the contents displayed on the display 104, the moving image reproduction screen 130 is scrolled out of the display 104, as depicted in (B) of FIG. 1. The CPU 101, therefore, detects that the results of the given function performed by the first peripheral device 102 are no longer displayed on the display screen.

(2) Upon detecting that the results of the given function are no longer being displayed on the display screen, the CPU 101 starts supplying power to the second peripheral device 103. For example, the CPU 101 controls a power management unit (PMU) (not depicted) and starts supplying power to the second peripheral device 103, to which power supply has been suspended.

(3) Upon detecting that the results of the given function are no longer being displayed on the display screen, the CPU 101 suspends power supply to the first peripheral device 102. For example, the CPU 101 controls the PMU (not depicted) and suspends power supply to the first peripheral device 102.

(4) Upon receiving a control signal from the CPU 101, the second peripheral device 103 outputs a response signal to the CPU 101 in response to the incoming control signal. For example, when the second peripheral device 103 receives a task request ("req" in FIG. 1) from the app A under execution, the second peripheral device 103 transmits to the CPU 101, a response signal ("ack" in FIG. 1) indicating normal completion of the task related to the given function.

In this manner, according to the power supply control method of the embodiment, when the given function disappears from the display screen, power supply to the first peripheral device 102 is suspended and power supply to the second peripheral device 103 is started. The operation of the first peripheral device 102 is emulated by the second peripheral device 103 and the second peripheral device 103 returns the same response as the response returned by the first peripheral device 102, in response to the control signal from the CPU 101. As a result, unnecessary power consumption by the first peripheral device 102 for processing a moving image that is not displayed on the display 104 can be reduced. Hence, the total power consumption by the system 100 as a whole can be suppressed.

With reference to FIG. 2, an example of a power supply control process by the system 100 will be described for a case where the moving image reproduction screen 130 that ceased to be displayed on the display 104 is again displayed as a result of a scrolling of the contents displayed on the display 104.

(5) The CPU 101 detects that the results of the given function performed by the first peripheral device 102 are being displayed on the display screen. For example, the CPU 101 detects the display of the moving image reproduction screen 130 on the display 104.

In the example depicted in FIG. 2, as a result of scrolling (up) the contents displayed on the display 104 as depicted in (C) of FIG. 2, the moving image reproduction screen 130 is displayed on the display 104, as depicted in (D) of FIG. 2. The CPU 101, therefore, detects that the results of the given function performed by the first peripheral device 102 are being displayed on the display screen.

(6) Upon detecting display of the results of the given function on the display screen, the CPU 101 starts supplying power to the first peripheral device 102. For example, the CPU 101 controls the power management unit (PMU) (not depicted) and resumes power supply to the first peripheral device 102, to which power supply has been suspended.

(7) Upon detecting the display of the results of the given function on the display screen, the CPU 101 suspends the power supply to the second peripheral device 103. For example, the CPU 101 controls the PMU (not depicted) and suspends power supply to the second peripheral device 103.

(8) Upon receiving a control signal from the CPU 101, the first peripheral device 102 outputs a response signal to the CPU 101 in response to the incoming control signal. For example, when the first peripheral device 102 receives a task request ("req" in FIG. 2) from the app A under execution, the first peripheral device 102 executes the task related to the given function.

If having normally executed the task related to the given function, the first peripheral device 102 transmits to the CPU 101, a response signal ("ack" in FIG. 2) indicating normal completion of execution of the task related to the given function. If having failed to execute the task related to the given function, the first peripheral device 102 transmits a nak signal ("nak" in FIG. 2) to the CPU 101.

In this manner, according to the power supply control method of the embodiment, when display of the results of the given function is resumed on the display screen, power supply to the first peripheral device 102 is resumed and power supply to the second peripheral device 103 is suspended. Thus, power supply to the first peripheral device 102 can be controlled without hampering seamless operation of the app A.

A case of applying the system 100 to a portable terminal 300 will be described. The portable terminal 300 is provided as, for example, a cellular phone, smart phone, tablet computer, personal digital assistant, etc.

Figure 3:
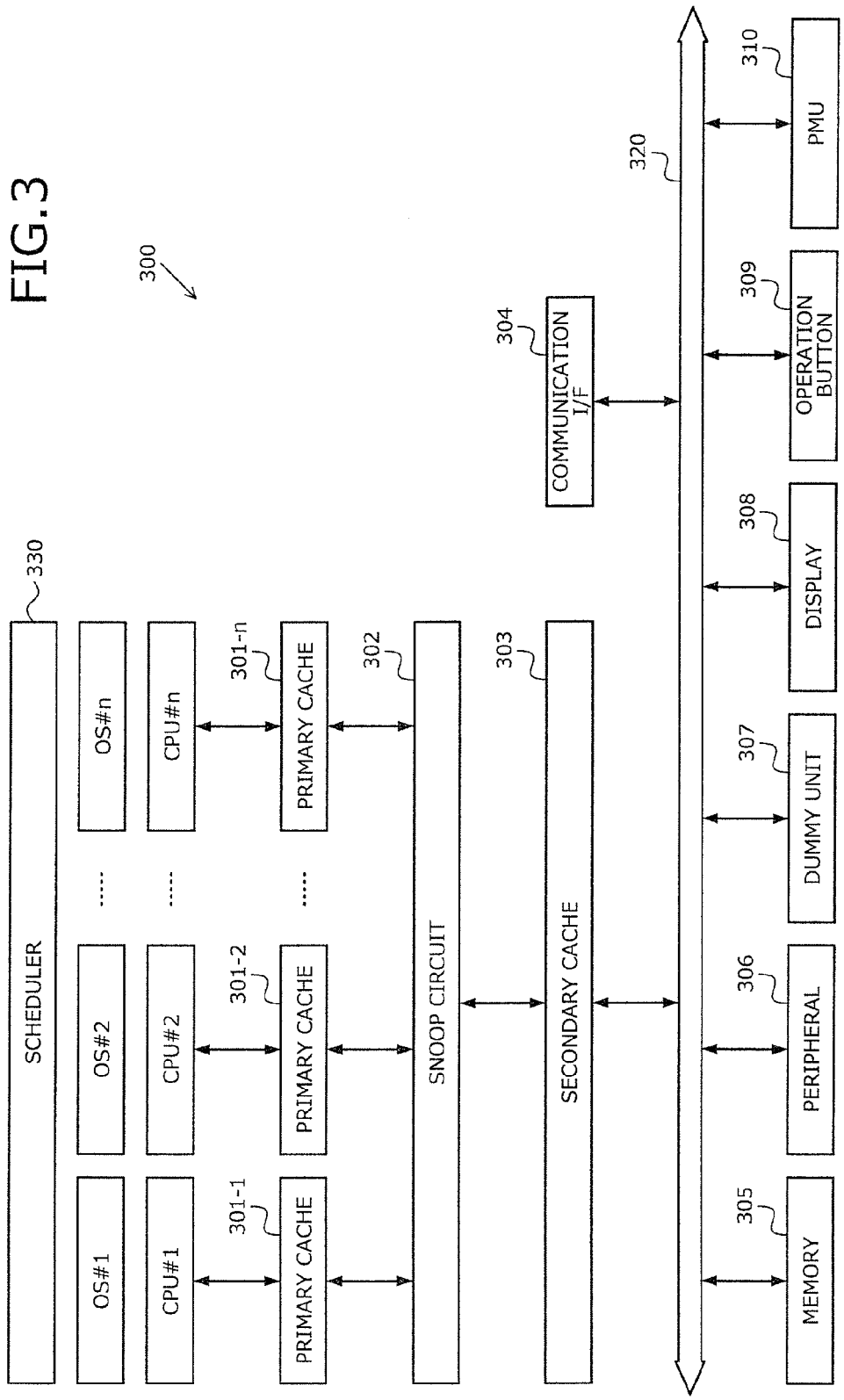
FIG. 3 is an explanatory diagram of an example of a system configuration of a portable terminal 300.

FIG. 3 is an explanatory diagram of an example of a system configuration of the portable terminal 300. In FIG. 3, the portable terminal 300 includes CPUs #1 to #n, primary caches 301-1 to 301-n, a snoop circuit 302, a secondary cache 303, a communication interface (I/F) 304, memory 305, a peripheral 306, a dummy unit 307, a display 308, an operation button 309, and a PMU 310. In the portable terminal 300, the secondary cache 303, the communication interface (I/F) 304, the memory 305, the peripheral 306, the dummy unit 307, the display 308, the operation button 309, and the PMU 310 are interconnected through a bus 320.

The CPU #1 executes an OS #1 and supervises overall control of the portable terminal 300. The OS #1 serves as a master OS and has a scheduler 330 that determines to which CPU an application is to be assigned. The CPU #1 executes applications assigned thereto. The CPUs #2 to #n run the OSs #2 to #n, respectively, and execute respective applications assigned to the OSs. The CPUs #2 to #n serve as slave OSs.

Each of the CPUs #1 to #n has a register and a core. Each register has a program counter and a reset register. The CPUs #1 to #n are connected to other units via the primary caches 301-1 to 301-n, the snoop circuit 302, and the secondary cache 303, respectively. In the following explanation, an arbitrary CPU among the CPUs #1 to #n is referred to as "CPU #i" (i=1, 2, . . . , n).

Each of the primary caches 301-1 to 301-n has cache memory and a cache controller. For example, the primary cache 301-1 temporarily stores therein writing data that is to be written to the memory 305 by an application executed by the OS #1, and temporarily stores therein data read out of the memory 305.

The snoop circuit 302 ensures the consistency of the primary caches 301-1 to 301-n accessed by the CPUs #1 to #n. For example, when data shared among the primary caches 301-1 to 301-n is updated at any one of the primary caches, the snoop circuit 302 detects the data updating and updates the other primary caches.

The secondary cache 303 has cache memory and a cache controller. The secondary cache 303 stores therein data pushed out of the primary caches 301-1 to 301-n. For example, the secondary cache 303 stores therein data shared among the OSs #1 to #n.

The communication I/F 304 is connected to a network, such as a local area network (LAN), a wide area network (WAN), and the Internet, and is connected to other devices via the network. The communication I/F 304 works as an interface between the network and the interior of the portable terminal, and controls the input and output of data with respect to external devices.

The memory 305 is memory shared among the CPUs #1 to #n. The memory 305 has, for example, read-only memory (ROM), random access memory (RAM), flash ROM, etc. For example, the flash ROM stores therein programs for the OSs, the ROM stores therein application programs, and the RAM is used as a work area of the CPUs #1 to #n. Programs stored in the memory 305 are loaded onto the CPUs, whereby the CPUs execute processes coded in the programs.

The peripheral 306 is hardware that implements a given function, and is equivalent to the first peripheral device 102 depicted in FIGS. 1 and 2. The peripheral 306 assumes a task related to the given function in place of the CPUs #1 to #n and thereby, improves the processing performance of the portable terminal 300 as a whole.

The peripheral 306 represents one or more peripherals. The portable terminal 300, therefore, may have multiple peripherals. For this reason, in the following explanation, the peripheral 306 of the portable terminal 300 may be referred to as "peripherals P1 to Pm" (m denotes a natural number of 1 or greater). An arbitrary peripheral among the peripherals P1 to Pm is referred to as "peripheral Pj" (j=1, 2, . . . , m).

The dummy unit 307 is hardware that returns the same response signal as the response signal returned by the peripheral 306 in response to a control signal from the CPUs #1 to #n, and is equivalent to the second peripheral device 103 depicted in FIGS. 1 and 2. The dummy unit 307 will be described in detail with reference to FIG. 4.

The display 308 displays a cursor, icons, tool boxes, and data of documents, images, and functional information. For example, a thin-film transistor, a liquid crystal display, etc. may be adopted as the display 308.

The operation button 309 includes keys for inputting numbers, various instructions, etc., and is used for data input. The operation button 309 may be provided as a touch panel type input pad, numeric keypad, etc. The PMU 310 supplies a source voltage to each unit.

Figure 4:
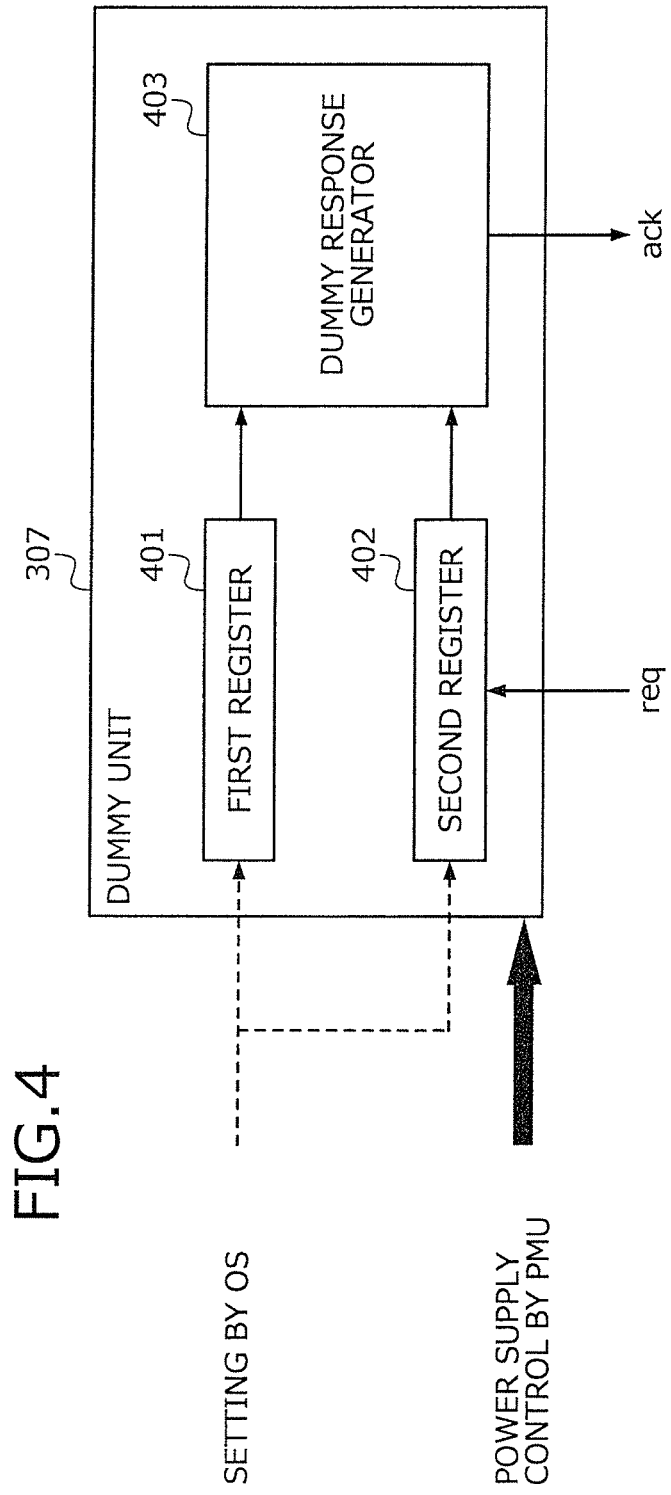
FIG. 4 is an explanatory diagram of an example of a configuration of a dummy unit 307.

FIG. 4 is an explanatory diagram of an example of a configuration of the dummy unit 307. In FIG. 4, the dummy unit 307 includes a first register 401, a second register 402, and a dummy response generator 403.

The first register 401 is a dummy control register to which information supplied from the peripheral 306 to a CPU #i is written. For example, a response signal ("ack" in FIG. 4) transmitted from the peripheral 306 to the CPU #i in response to a control signal from the CPU #i is set in the first register 401.

The second register 402 is a channel mask setting register for which the same channel as a channel set between the CPU #i and the peripheral 306 is set. For example, information for identifying a control signal ("req" in FIG. 4) transmitted from the CPU #i to the peripheral 306 is set in the second register 402.

The dummy response generator 403 transmits a response signal set in the first register 401 to the CPU #i in response to a control signal from the CPU #i identified from the channel set for the second register 402. In this manner, a dummy response signal corresponding to each of the peripherals P1 to Pm can be returned to the CPU #i.

A correspondence table 500 used by the portable terminal 300 will be described. The correspondence table 500 provides information indicating the correspondence relations between apps and the peripheral 306. The correspondence table 500 is stored in, for example, the primary caches 301-1 to 301-*n*, the second cache 303, the memory 305, etc. depicted in FIG. 3.

FIG. 5 is an explanatory diagram of an example of the contents of the correspondence table 500. In FIG. 5, the correspondence table 500 has fields for app IDs and peripheral IDs. By entering information in each field, correspondence information records 500-1 to 500-K for apps A1 to AK are created.

App IDs are identifiers of the apps A1 to AK executed by the portable terminal 300. Peripheral IDs are identifiers of the peripherals P1 to Pm. The correspondence information record 500-K, for example, indicates a peripheral Pj used by an app Ak.

A peripheral DB 600 used by the portable terminal 300 will be described. The peripheral DB 600 is stored in, for example, the primary caches 301-1 to 301-*n*, the second cache 303, the memory 305, etc. depicted in FIG. 3.

FIG. 6 is an explanatory view of an example of the contents of the peripheral DB 600. In FIG. 6, the peripheral DB 600 stores peripheral information records 600-1 to 600-*m* corresponding to peripherals P1 to Pm, respectively.

Each of the peripheral information records 600-1 to 600-*m* includes a peripheral ID, delay information, channel information, and control register information. Peripheral IDs are identifiers of the peripherals P1 to Pm. Delay information indicates the overhead time (e.g., 0.1 [sec.]) between the start of power supply to the peripherals P1 to Pm and the start of operation of the peripherals P1 to Pm.

Channel information is information indicative of a control signal transmitted from the CPU #i to the peripherals P1 to Pm. Control register information is information indicative of a response signal that is transmitted from the peripherals P1 to Pm to the CPU #i in response to a control signal from the CPU #i. The control register information may include information that indicates the interval between reception of the control signal from the CPU #i and transmission of the response signal.

Peripheral information 600-*j*, for example, indicates delay information Dj, channel information Cj, and control register information Rj of the peripheral Pj.

Figure 7:
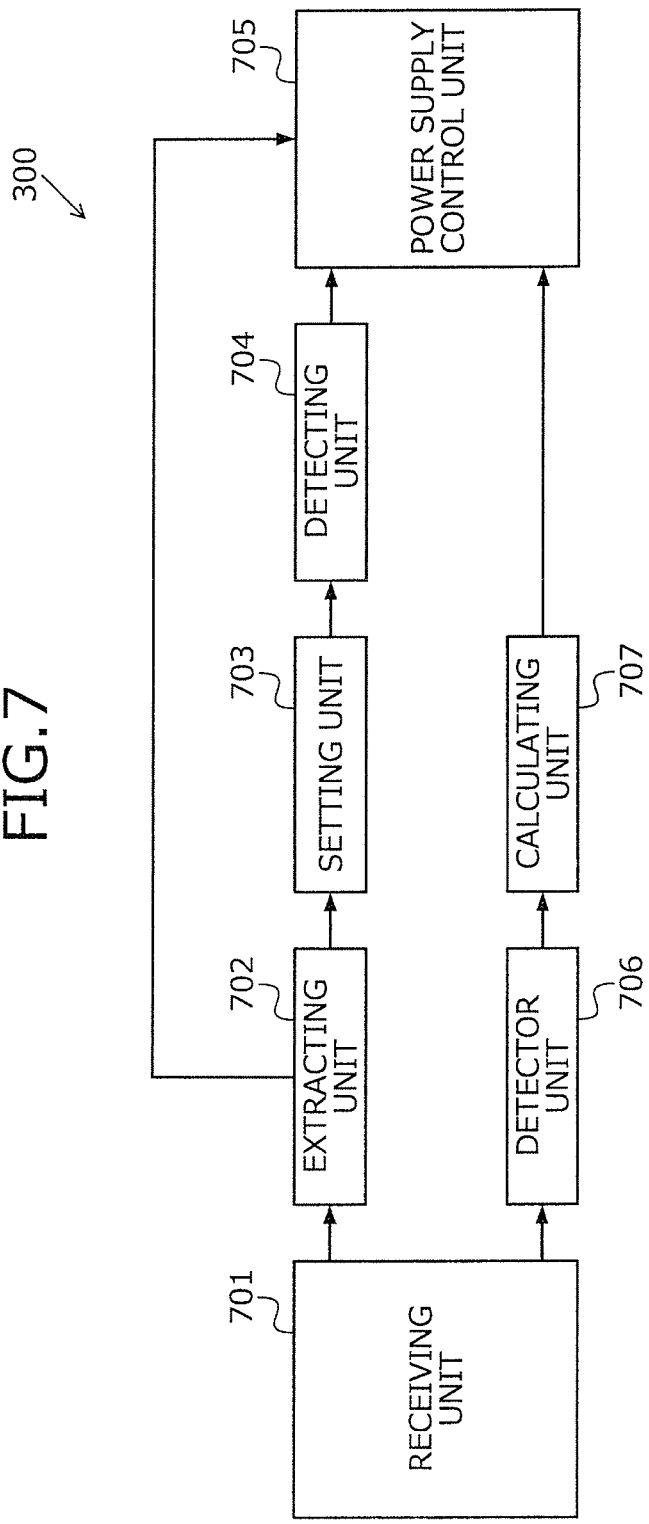
FIG. 7 is a block diagram of an example of a functional configuration of the portable terminal 300.

FIG. 7 is a block diagram of an example of a functional configuration of the portable terminal 300. In FIG. 7, the portable terminal 300 includes a receiving unit 701, an extracting unit 702, a setting unit 703, a detecting unit 704, a power supply control unit 705, a detector unit 706, and a calculating unit 707. These functional units (the receiving unit 701 to the calculating unit 707) serving as a control unit are implemented, for example, by executing on the CPU #1 to CPU #n, programs (e.g., OS #1 to OS #n) stored in the memory 305 depicted in FIG. 3, or by communication through the communication I/F 304. The result of processing by each functional unit is stored to, for example, the primary caches 301-1 to 301-*n*, the second cache 303, the memory 305, etc.

The receiving unit 701 receives notification of the start of the app Ak. The start of the app Ak means, for example, a state where the app Ak assigned to the CPU #i is dispatched.

The extracting unit 702 extracts peripheral information concerning the peripheral Pj used by the app Ak. For example, the extracting unit 702 refers to the correspondence table 500 depicted in FIG. 5 and identifies the peripheral Pj used by the app Ak for which the start notification has been received. The extracting unit 702 then extracts the peripheral information 600-*j* for the identified peripheral Pj from the peripheral DB of FIG. 6.

The setting unit 703 sets the extracted peripheral information in the dummy unit 307. For example, the setting unit 703 sets the control register information Rj included in the extracted peripheral information 600-*j* in the first register 401 (see FIG. 4) of the dummy unit 307. The setting unit 703 also sets the channel information Cj included in the peripheral information 600-*j* in the second register 402 (see FIG. 4) of the dummy unit 307. Setting of such information in each of the registers 401 and 402 may be performed in such a way that, for example, the setting unit 703 transmits the control register information Rj and the channel information Cj to the dummy unit 307 where the dummy response generator 403 sets the control register information Rj and channel information Cj in the registers 401 and 402.

The detecting unit 704 detects that the results of a given function performed by the peripheral Pj are being displayed on the display 308. For example, the detecting unit 704 detects the display of a moving image reproduction screen (e.g., moving image reproduction screen 130 in FIG. 1) on the display 308, the moving image reproduction screen being for displaying a moving image processed by the peripheral Pj.

The detecting unit 704 also detects that the results of the given function performed by the peripheral Pj are no longer being displayed on the display 308. For example, the detecting unit 704 detects that the moving image reproduction screen is no longer displayed on the display 308. If multiple moving image reproduction screens are present, for example, the detecting unit 704 detects that all the moving image reproduction screens are no longer being displayed on the display 308.

For example, the detecting unit 704 determines whether a part of or the entire moving image reproduction screen is included among the contents currently being displayed, based on the coordinate position of the contents currently being displayed and the coordinate position of the moving image reproduction screen indicated in screen information displayed on the display 308. The screen information displayed on the display 308 is, for example, a Web page.

If the moving image reproduction screen is included among the contents currently being displayed, the detecting unit 704 detects the display of the results of the given function performed by the peripheral Pj, on the display 308. If the moving image reproduction screen is not included among the contents currently being displayed, the detecting unit 704 detects that the results of the given function performed by the peripheral Pj are no longer being displayed on the display 308.

Windows for multiple apps are displayed on the display 308 in some cases. In such a case, for example, the detecting unit 704 may determine whether a window for the app Ak is displayed in the foreground. If the window for the app Ak is displayed in the foreground, the detecting unit 704 detects that the results of the given function performed by the peripheral Pj are being displayed on the display 308. If the window for the app Ak is not displayed in the foreground, the detecting unit 704 detects that the results of the given function performed by the peripheral Pj are no longer being displayed on the display 308.

When the display of the results of the given function on the display 308 is detected, the power supply control unit 705 transmits an instruction to start power supply to the peripheral Pj, to the PMU 310. For example, the power supply control unit 705 sets in a setting register (not depicted) in the PMU 310, a value for the start of power supply to the peripheral Pj.

When cessation of the display of the results of the given function is detected, the power supply control unit 705 transmits to the PMU 310, an instruction to start power supply to the dummy unit 307. For example, the power supply control unit 705 sets in the setting register (not depicted) in the PMU 310, a value for the start of power supply to the dummy unit 307.

When the cessation of the display of the results of the given function is detected, the power supply control unit 705 transmits to the PMU 310, an instruction to suspend power supply to the peripheral Pj. For example, the power supply control unit 705 sets in the setting register (not depicted) in the PMU 310, a value for suspension of power supply to the peripheral Pj.

When the cessation of the display the results of the given function is detected and then display of the results of the given function is again detected, the power supply control unit 705 transmits to the PMU 310, an instruction to suspend power supply to the dummy unit 307. For example, the power supply control unit 705 sets in the setting register (not depicted) in the PMU 310, a value for suspension of power supply to the dummy unit 307.

In an initial state, for example, power supply to the peripheral Pj and to the dummy unit 307 is suspended. Power supply to the peripheral Pj may be started when notification of the start of the app Ak is received.

The detector unit 706 detects input operation for scrolling the display contents on the display 308. For example, the detector unit 706 detects a user scroll operation of scrolling the display contents on the display 308 using the operation button 309 depicted in FIG. 3.

The calculating unit 707 calculates the estimated time required for display of the results of the given function on the display 308. For example, the calculating unit 707 calculates the estimated time required for display of the moving image reproduction screen on the display 308 (hereinafter "estimated moving image display time T"), based on the direction, speed, and acceleration of a detected scroll operation. The specific contents of processing by the calculating unit 707 will be described with reference to FIG. 8.

The power supply control unit 705 may transmit to the PMU 310, an instruction to start power supply to the peripheral Pj, based on the result of the above calculation. For example, before the point in time at which the estimated moving image display time T elapses from the current time, the power supply control unit 705 transmits to the PMU 310, an instruction to start power supply to the peripheral Pj.

Between the start of the power supply to the peripheral Pj and the start of the operation of the peripheral Pj, a time lag exists as a given overhead time (hereinafter "overhead time $T_{OH}$"). As a result, for example, when the power supply to the peripheral Pj is started at the point in time at which the estimated moving image display time T has elapsed from the current time, the start of the operation of the peripheral Pj is delayed from that point in time by the overhead time $T_{OH}$.

For this reason, the power supply control unit 705 may transmit an instruction to start power supply to the peripheral Pj, to the PMU 310 before a point of time obtained by subtracting the overhead time $T_{OH}$ from the point in time at which the estimated moving image display time T elapses from the current time. The overhead time $T_{OH}$ of the peripheral Pj can be identified, for example, from the delay information Dj included in the peripheral information 600-j of the peripheral Pj.

For example, at a point in time at which a given time TS has elapses from the current time, the power supply control unit 705 may transmit to the PMU 310, an instruction to start power supply to the peripheral Pj. The given time TS can be expressed, for example, by equation (1), where $T_o$ denotes an arbitrary constant (e.g., $T_o$=0.1 [sec]). The arbitrary constant $T_o$, for example, is stored in the primary caches 301-1 to 301-n, the second cache 303, the memory 305, etc., as a preset value.

$$TS = T - T_{OH} - T_o \qquad (1)$$

Thus, a case is prevented where when the display of the results of a given function is resumed, the moving image processing by the peripheral Pj is not in time for execution of the given function. An example of power supply control by the power supply control unit 705 will be described with reference to FIG. 9.

The calculating unit 707 may calculate the estimated time required for the cessation of the display of the results of the given function. For example, the calculating unit 707 calculates the estimated time required for the cessation of the display of the moving image reproduction screen (hereinafter "estimated moving image cessation time"), based on the direction, speed, and acceleration of a detected scroll operation.

In this case, the power supply control unit 705 may transmit to the PMU 310, an instruction to start power supply to the dummy unit 307, based on the result of the above calculation. For example, before the point in time at which the estimated moving image cessation time elapses from the current time, the power supply control unit 705 transmits to the PMU 310, an instruction to start power supply to the dummy unit 307.

In the same manner as in the case of the peripheral Pj, between the start of power supply to the dummy unit 307 and the start of operation of the dummy unit 307, a time lag exists as a given overhead time. For this reason, before the point in time obtained by subtracting the overhead time from the point in time at which the estimated moving image cessation time elapses from the current time, the power supply control unit 705 may transmit to the PMU 310, an instruction to start power supply to the dummy unit 307. The overhead time of the dummy unit 307 is stored in, for example, the primary caches 301-1 to 301-n, the second cache 303, the memory 305, etc.

Thus, the start of the dummy unit 307 can be completed before the point in time when the result of the given function ceases to be displayed on the display screen. This prevents a case where the operation of the dummy unit 307 is not in time for the cessation of the display of the results of the given function.

Some apps, such as the app A2 depicted in FIG. 5, use multiple peripherals (e.g., peripherals P1 and P2). In a case where the app A2 is assumed to be a browser capable of reproducing audio, for example, the peripheral P1 is a video decoder accelerator that processes moving images and the peripheral P2 is a sound decoder accelerator that processes audio.

When the app A2 is a map application, for example, the peripheral P1 is a video decoder accelerator that processes moving images that show map information in which the current position of the portable terminal 300 is indicated, and the peripheral P2 is a global positioning system (GPS) that performs a process of determining the current position of the portable terminal 300.

In such a case, for example, according to priority levels given in advance to the peripherals P1 to Pm, respectively, the power supply control unit 705 may control power supply to a peripheral of a high priority level among the peripherals used by the app Ak. For example, a higher priority level is given to a peripheral that consumes a larger amount of power among the multiple peripherals.

The portable terminal 300, for example, may have a dummy unit 307 for each peripheral Pj. In this case, peripheral information for each peripheral Pj can be set in advance in the corresponding dummy unit 307. As a result, the processes by the extracting unit 702 and the setting unit 703 can be omitted.

The detector unit 706 may detect an instruction to suspend a given function performed by the peripheral Pj or an instruction to resume the given function. One example of a given function is a muting function. For example, the detector unit 706 detects a muting operation executed by use of the operation button 309. When an instruction to suspend the given function is detected, the power supply control unit 705 may transmit to the PMU 310, an instruction to suspend power supply to the peripheral Pj and at the same time, transmit to the PMU 310 an instruction to start power supply to the dummy unit 607. When an instruction to resume the given function is detected, the power supply control unit 705 may transmit to the PMU 310, an instruction to start power supply to the peripheral Pj and at the same time, transmit to the PMU 310, an instruction to suspend power supply to the dummy unit 607. Consequently, unnecessary power consumption by the peripheral Pj for a given function not used by the user can be reduced.

Details of the process that the calculating unit 707 executes to calculate the estimated moving image display time T required for the display of a moving image reproduction screen on the display 308 will be described.

Figure 8:
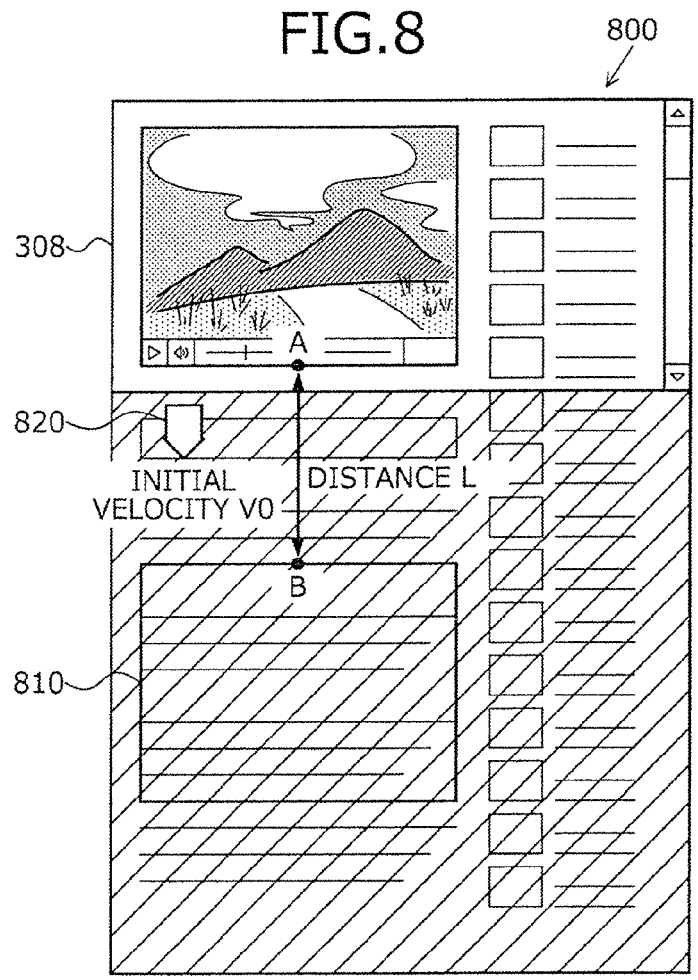
FIG. 8 is an explanatory diagram of an example of the contents displayed on a display 308.

FIG. 8 is an explanatory diagram of an example of the contents displayed on the display 308. In the example depicted in FIG. 8, a Web page 800 is displayed on the display 308. In this example, the image size of the entire Web page 800 is greater than the display size of the display 308. As a result, a moving image reproduction screen 810 included in the Web page 800 is not displayed on the display 308.

A case is assumed where the user, using the operation button 309, scrolls the display contents of the display 308 in the direction of indicated by an arrow 820, to display the moving image reproduction screen 810 on the display 308. In this case, the initial velocity of scrolling is "$V_0$", and the distance between the contents displayed on the display 308 just before the scrolling and the moving image reproduction screen (e.g., moving image reproduction screen 810) is "L".

The initial velocity $V_0$ is, for example, set in advance and is stored in the primary caches 301-1 to 301-n, the second cache 303, the memory 305, etc. The distance L is, for example, calculated based on the coordinate position of the current display contents (e.g., coordinate position of a point A in FIG. 8) and the coordinate position of the moving image reproduction screen (e.g., coordinate position of a point B in FIG. 8).

A case will be described, in which the user presses a key of the operation button 309 to scroll the display contents of the display 308 in a uniform linear motion with the initial velocity of $V_0$.

In this case, the calculating unit 707 can calculate the estimated moving image display time T required for display of the moving image reproduction screen 810 on the display 308, for example, using equation (2), where T denotes the estimated moving image display time required for display of the moving image reproduction screen on the display 308, $V_0$ denotes the initial velocity of scrolling, and L denotes the distance between the display contents of the display 308 immediately before the scrolling and the moving image reproduction screen.

$$T=L/V_0 \quad (2)$$

A case is assumed where the initial velocity $V_0$ is determined to be "$V_0$=10 [cm/sec]" and the distance L is determined to be "L=20 [cm]". In this case, the estimated moving image display time T is calculated at "T=2 [sec]".

In this manner, the estimated moving image display time T required for display of the moving image reproduction screen 810 on the display 308 is calculated for a case where the display contents of the display 308 is scrolled in the uniform linear motion at the initial velocity $V_0$.

Another case will be described, in which the user touches a touch panel type input pad of the operation button 309 to scroll the display contents of the display 308 in a uniformly accelerated linear motion with the initial velocity $V_0$ and an attenuation factor $\alpha$.

In this case, the calculating unit 707 can calculate the estimated moving image display time T required for display of the moving image reproduction screen 810 on the display 308, for example, using equation (3), where T denotes the estimated moving image display time required for display of the moving image reproduction screen on the display 308, $V_0$ denotes the initial velocity of scrolling, L denotes the distance between the moving image reproduction screen and the display contents of the display 308 immediately before the scrolling, and $\alpha$ denotes the attenuation factor of the initial velocity $V_0$.

$$V_0\{T-(2/\alpha)T^2\}=L \quad (3)$$

A case is assumed where the initial velocity $V_0$ is determined to be "$V_0$=20 [cm/sec]", the distance L is determined to be "L=10 [cm]", and the attenuation factor $\alpha$ is determined to be "$\alpha$=1". In this case, the estimated moving image display time T is calculated to be "T=1 [sec]".

In this manner, the estimated moving image display time T required for display of the moving image reproduction screen 810 on the display 308 is calculated for a case where the display contents of the display 308 is scrolled in a uniformly accelerated linear motion at the initial velocity $V_0$ and the attenuation factor $\alpha$.

An example of power supply control performed by the power supply control unit 705 to control power supply to the peripheral Pj and the dummy unit 307 will be described.

Figure 9:
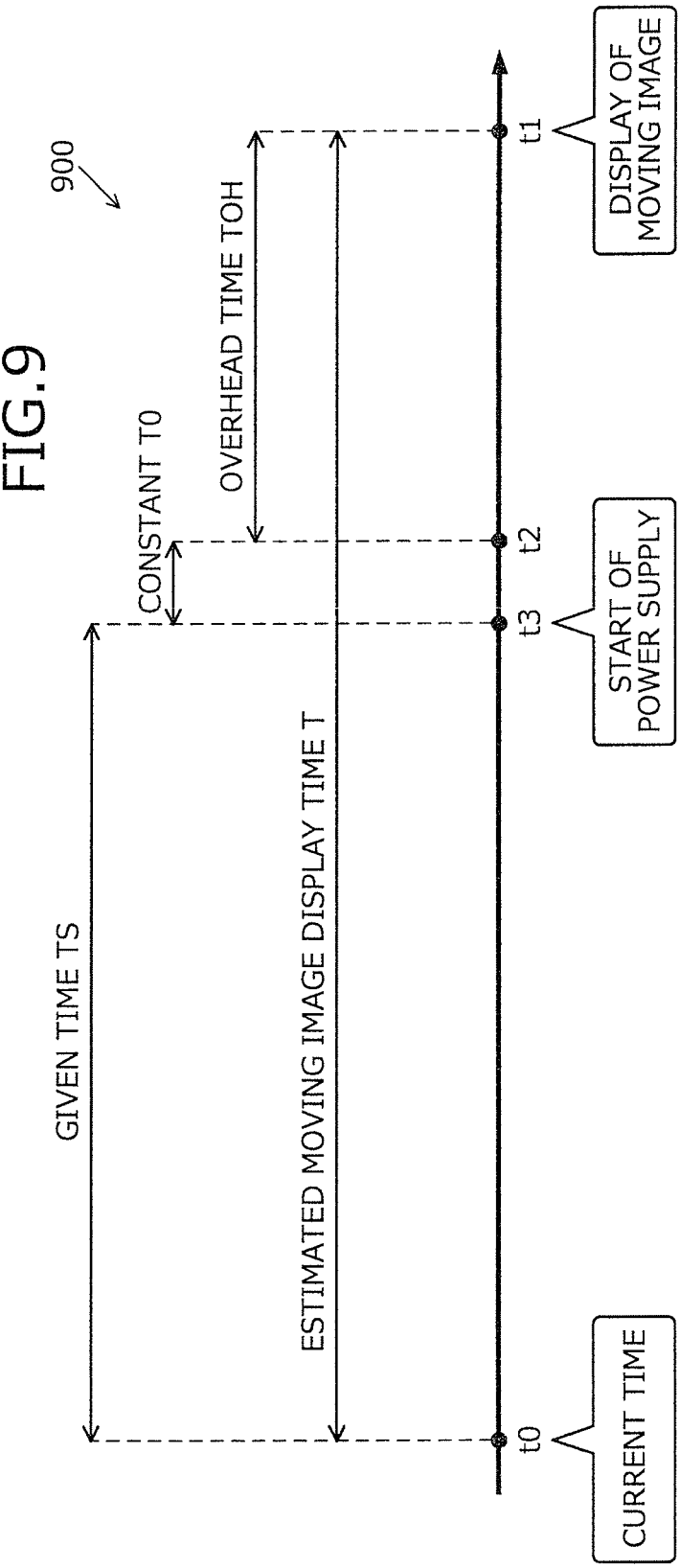
FIG. 9 is a time chart of an example of power supply control.

FIG. 9 is a time chart of an example of power supply control. In a time chart 900 depicted in FIG. 9, time t0 represents the current time. The current time is the point in time at which, for example, a scroll operation is started or the estimated moving image display time T is calculated. Time t1 represents a point in time at which the estimated moving image display time T has elapsed since the current time. Time t2 represents a point in time obtained by subtracting the overhead time $T_{OH}$ from time t1. Time t3 represents a point in time obtained by subtracting a constant $T_0$ from time t2.

In this example, at time t3 when a given time TS has elapsed since time t0, the power supply control unit 705 transmits to the PMU 310, an instruction to start power supply to the peripheral Pj. For example, a case is assumed where the estimated moving image display time T is determined to be "T=2.0 [sec]", the overhead $T_{OH}$ is determined to be "$T_{OH}$=0.1 [sec]", and the constant $T_0$ is determined to be "$T_0$=0.1 [sec]".

In this case, the given time TS is calculated to be "TS=2.0−0.1−0.1=1.8". Thus, at time t3 at which 1.8 [sec]

has elapsed since time t0, the power supply control unit 705 transmits to the PMU 310 the instruction to start power supply to the peripheral Pj. An instruction to suspend power supply to the dummy unit 307 is transmitted to the PMU 310, for example, at time t1 when the estimated moving image display time T has elapsed since time t0.

In this manner, power supply to the peripheral Pj is started at time t3 when the given time TS has elapsed since time t0. This prevents a case where when the moving image reproduction screen is displayed on the display 308, the moving image processing by the peripheral Pj is not in time for moving image reproduction.

A power supply control procedure by the portable terminal 300 will be described. A power supply control procedure in a case of suspending power supply to the peripheral Pj will be described. In this case, the CPU #1 starts the app Ak, and the peripheral Pj used by the app Ak is a peripheral that executes moving image processing.

Figure 10:
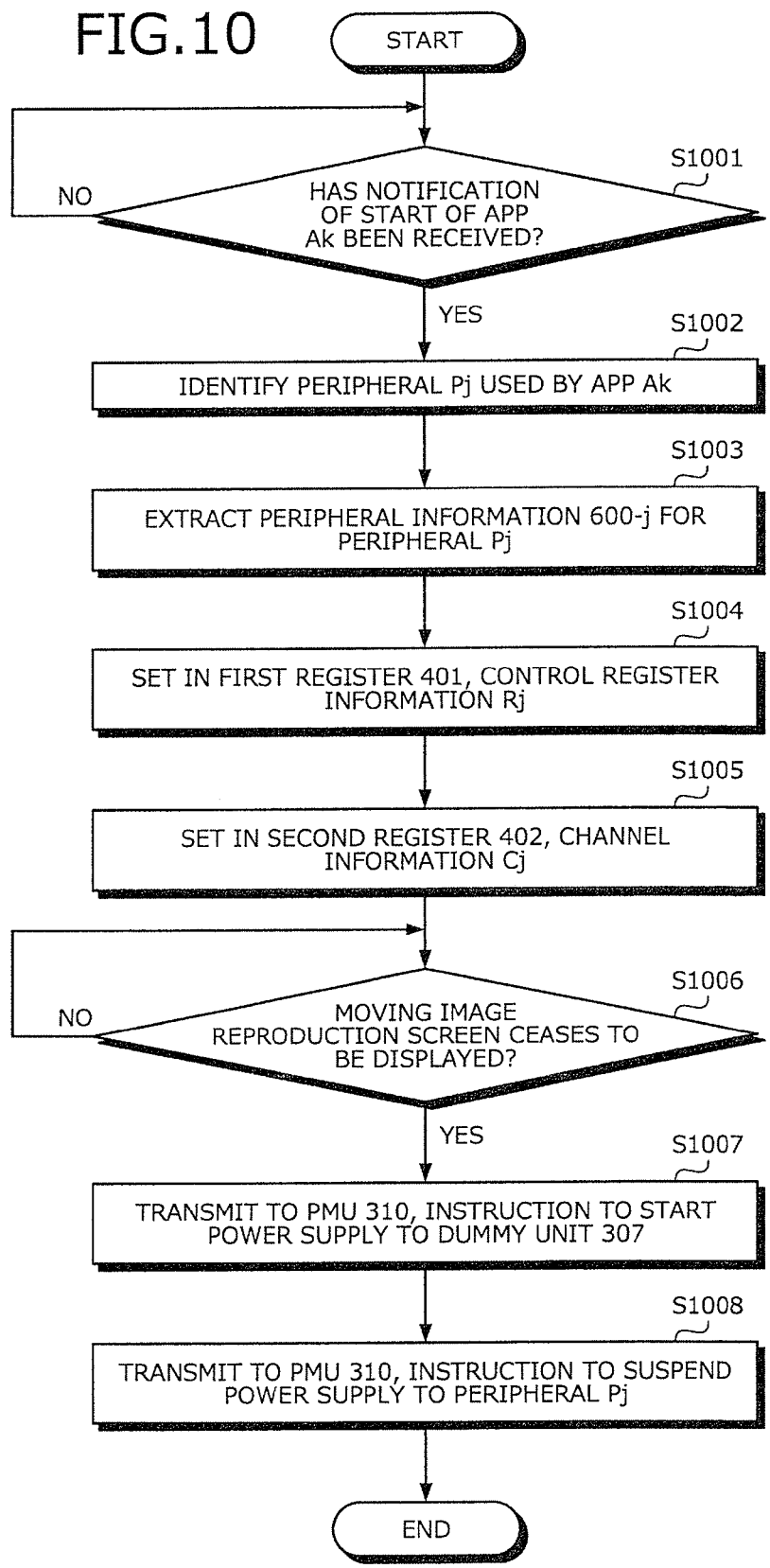
FIG. 10 is a flowchart of an example of a first power supply control procedure by the portable terminal 300.

FIG. 10 is a flowchart of an example of a first power supply control procedure by the portable terminal 300. In the flowchart depicted in FIG. 10, the CPU #1 determines whether notification of the start of the app Ak has been received (step S1001).

The CPU #1 stands by until receiving notification of the start of the app Ak (step S1001: NO). When receiving the notice of start of the app Ak (step S1001: YES), the CPU #1 refers to the correspondence table 500 and identifies the peripheral Pj used by the app Ak (step S1002).

The CPU #1 then extracts the peripheral information 600-$j$ for the peripheral Pj from the peripheral DB 600 (step S1003). The CPU #1 sets in the first register 401 of the dummy unit 307, the control register information Rj included in the peripheral information 600-$j$ (step S1004).

The CPU #1 then sets in the second register 402 of the dummy unit 307, the channel information Cj included in the peripheral information 600-$j$ (step S1005). Subsequently, the CUP #1 determines whether a moving image reproduction screen displaying a moving image processed by the peripheral Pj ceases to be displayed on the display 308 (step S1006). The CPU #1 stands by until the moving image reproduction screen ceases to be displayed (step S1006: NO).

When the moving image reproduction screen has ceased to be displayed (step S1006: YES), the CPU #1 transmits to the PMU 310, an instruction to start power supply to the dummy unit 307 (step S1007). The CPU #1 then transmits to the PMU 310, an instruction to suspend power supply to the peripheral Pj (step S1008), and ends a series of steps of the flowchart.

In this manner, when the moving image reproduction screen ceases to be displayed on the display 308, power supply to the peripheral Pj is suspended and power supply to the dummy unit 307 is started. Setting the control register information Rj and channel information Cj of the peripheral Pj in the dummy unit 307 allows the dummy unit 307 to emulate an operation of the peripheral Pj used by the app Ak, as a dummy operation.

The processes executed at step S1004 and step S1005 may be executed in the reverse order. The processes executed at step S1007 and step S1008 may also be executed in the reverse order.

When the app Ak uses multiple peripherals, the CPU #1 may execute the processes at steps S1002 to S1005 and steps S1007 and S1008 for each peripheral Pj used by the app Ak. However, this case is possible on the assumption that the portable terminal 300 has a dummy unit 307 for each peripheral Pj.

A power supply control procedure in a case of resuming power supply to a peripheral Pj will be described.

Figure 11:
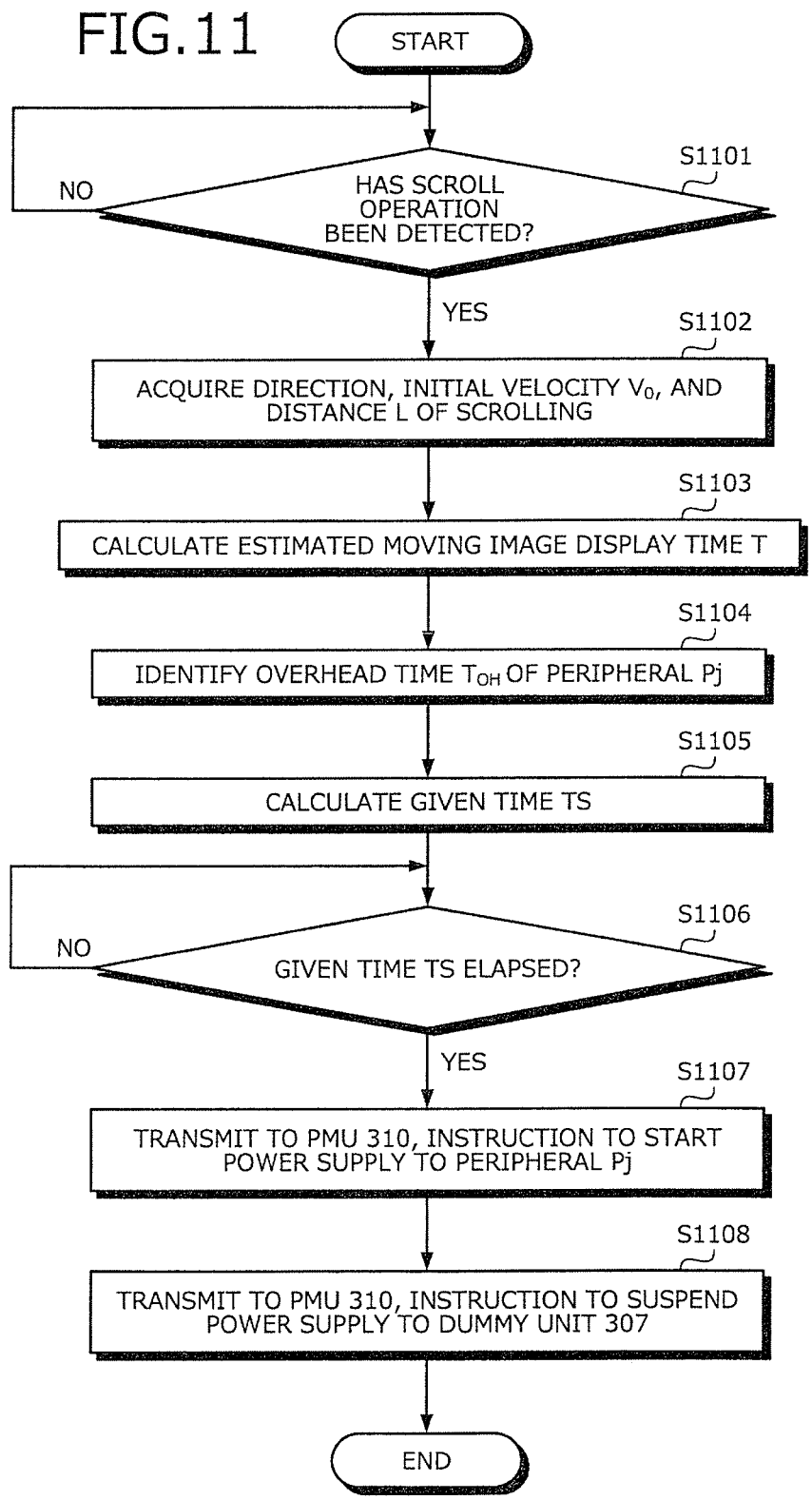
FIG. 11 is a flowchart of an example of a second power supply control procedure by the portable terminal 300.

FIG. 11 is a flowchart of an example of a second power supply control procedure by the portable terminal 300. In the flowchart depicted in FIG. 11, the CPU #1 determines whether a scroll operation of scrolling the display contents of the display 308 has been detected (step S1101).

The CPU #1 stands by until the scroll operation is detected (step S1101: NO), and when the scroll operation is detected (step S1101: YES), the CPU #1 acquires the direction, initial velocity $V_0$, and distance L of the scrolling (step S1102).

Subsequently, the CPU #1 substitutes the initial velocity $V_0$ and distance L of the scrolling into equation (2) above and calculates the estimated moving image display time T required for display of the moving image reproduction screen on the display 308 (step S1103). The CPU #1 then identifies the overhead time $T_{OH}$ of the peripheral Pj from the delay information Dj included in the peripheral information 600-$j$ (step S1104).

The CPU #1 substitutes the estimated moving image display time T, the overhead time $T_{OH}$, and the constant $T_0$ into equation (1) above and calculates the given time TS (step S1105). The CPU #1 then determines whether the given time TS has elapsed (step S1106). The CPU #1 stands by until the given time TS has elapsed (step S1106: NO).

When the given time TS has elapsed (step S1106: YES), the CPU #1 transmits to the PMU 310, an instruction to start power supply to the peripheral Pj (step S1107). The CPU #1 then transmits to the PMU 310, an instruction to suspend power supply to the dummy unit 307 (step S1108), and ends a series of steps of the flowchart.

In this manner, before display of the moving image reproduction screen on the display 308, power supply to the peripheral Pj is resumed and power supply to the dummy unit 307 is suspended. Thus, power supply to the peripheral Pj can be controlled without hampering seamless operation of the app A.

When the direction of scrolling is not in a direction to approach the moving image reproduction screen at step S1102, the CPU #1 may return to step S1101 and repeat a series of steps. The processes executed at step S1107 and S1108 may be executed in the reverse order.

When the app Ak uses multiple peripherals, the CPU #1 may execute the processes at steps S1104 to S1108 for each peripheral Pj used by the app Ak. However, this case is possible on the assumption that the portable terminal 300 has a dummy unit 307 for each peripheral Pj.

A response procedure performed by the dummy unit 307 to send a response to a control signal that is from the CPU #1 (app Ak) will be described.

Figure 12:
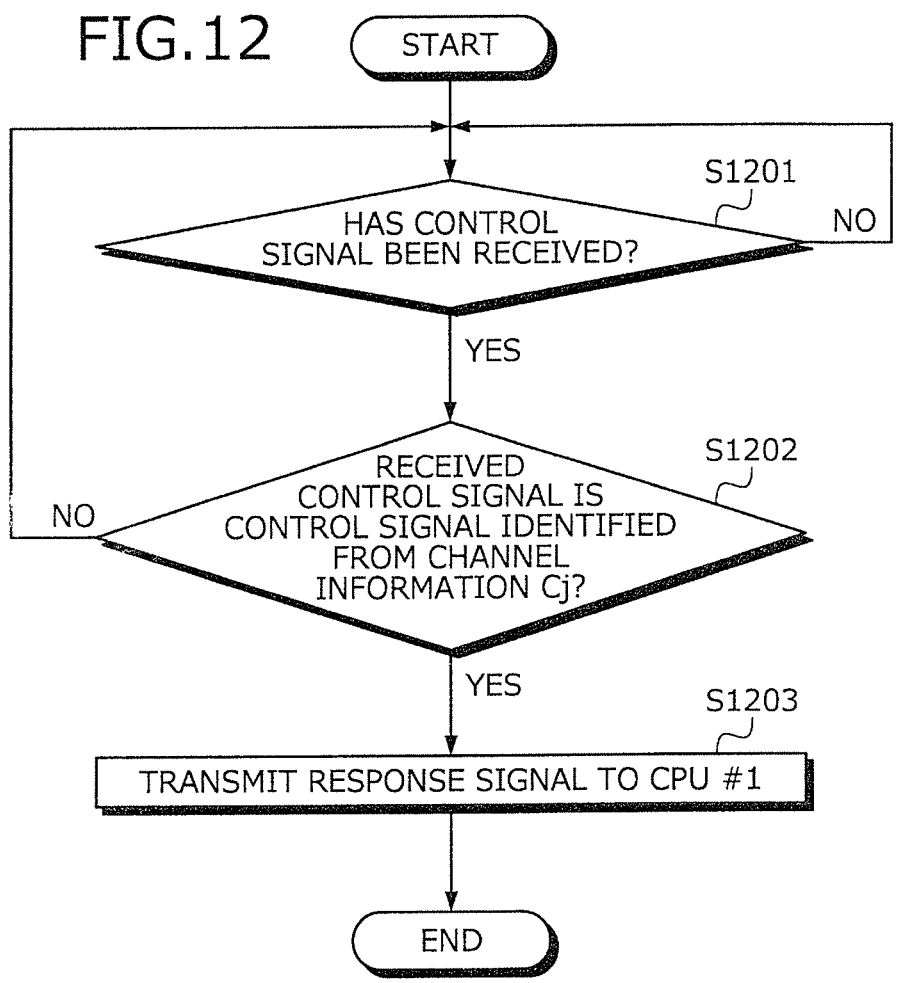
FIG. 12 is a flowchart of an example of the response procedure by the dummy unit 307.

FIG. 12 is a flowchart of an example of the response procedure by the dummy unit 307. In the flowchart depicted in FIG. 12, the dummy response generator 403 determines whether a control signal has been received from the CPU #1 (step S1201).

The dummy response generator 403 stands by until receiving a control signal (step S1201: NO). When receiving the control signal (step S1201: YES), the dummy response generator 403 determines whether the received control signal is equivalent to a control signal identified from the channel information Cj set in the second register 402 (step S1202).

If the received control signal is not equivalent to the control signal identified from the channel information Cj (step S1202: NO), the dummy response generator 403 returns to step S1201. If the received control signal is equivalent to the control signal identified from the channel information Cj (step S1202: YES), the dummy response generator 403 transmits to the CPU #1, a response signal set in the first register 401 (step S1203), and ends a series of steps of the flowchart.

In this manner, the operation of the peripheral Pj used by the app Ak is emulated.

An interval between reception of the control signal from the CPU #i and transmission of the response signal may be set in the first register 401. In such a case, at step S1203, the dummy response generator 403 may stand by until the interval set in the first register 401 comes to an end and then transmit the response signal to the CPU #1. As a result, the response signal can be transmitted to the CPU #1 at a timing adjusted to the time required for the moving image processing, etc. executed by the peripheral Pj.

Response signals of a number corresponding to the number of times that a control signal is received from the CPU #1 may be set in the first register 401. In such a case, at step S1203, the dummy response generator 403 may transmit to the CPU #1, response signals corresponding in number to the number of times that a control signal is received from the CPU #1. As a result, for example, a response signal corresponding to a state transition of the moving image processing, etc. executed by the peripheral Pj can be transmitted to the CPU #1.

The description above describes a case of determining whether the received control signal is the control signal identified from the channel information Cj set in the second register 402. However, configuration is not limited hereto. For example, a switching mechanism may be provided between the CPU #i, the peripheral Pj, and the dummy unit 307 so that the switching mechanism switches the transmission destination of the control signal that is from the CPU #1, between the peripheral Pj and the dummy unit 307. In this case, the determination process at step S1202 can be omitted.

Figure 13:
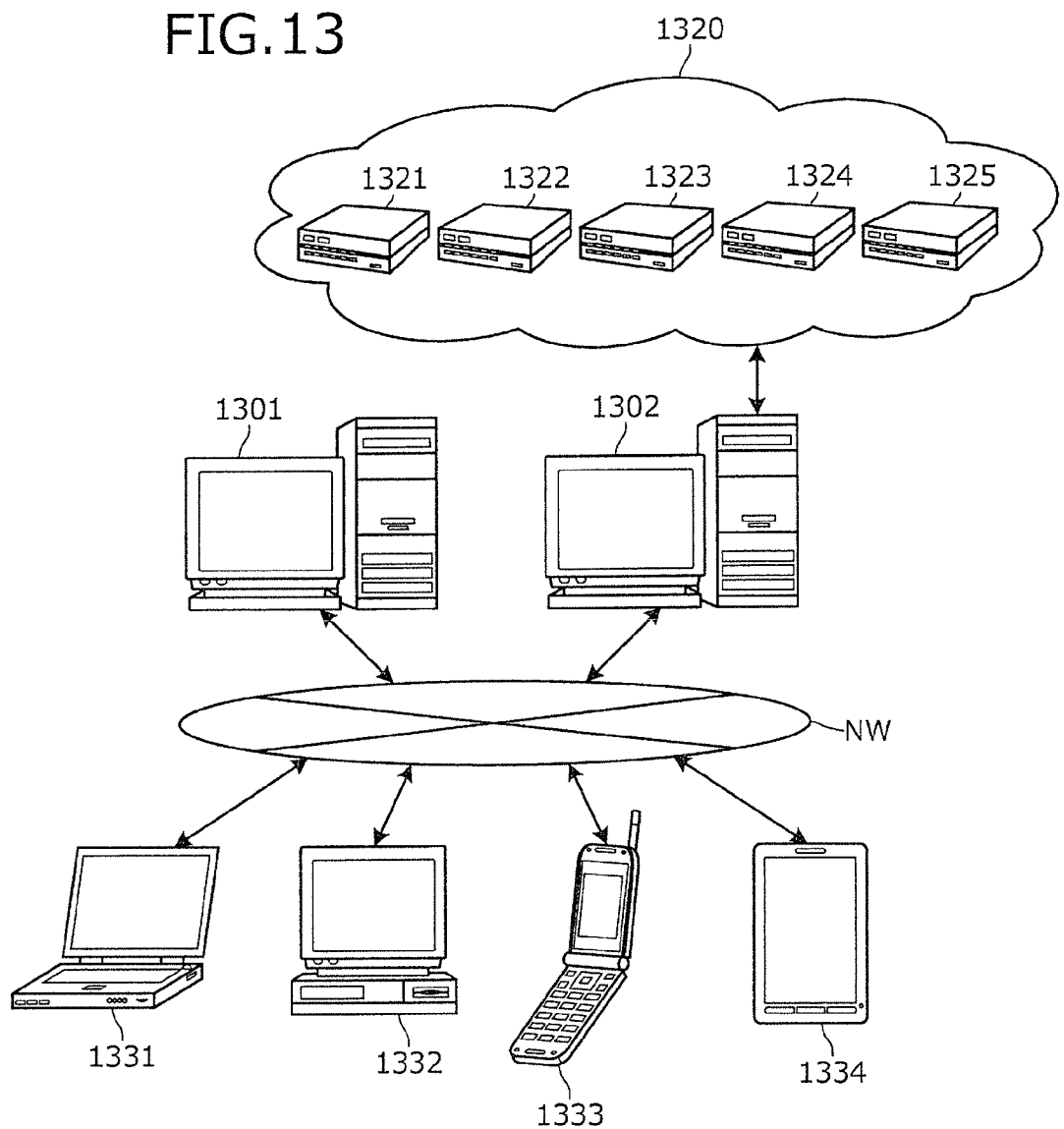
FIG. 13 is an explanatory view of an example of application of a system 100.

FIG. 13 is an explanatory view of an example of application of the system 100. In FIG. 13, a network NW is a network in which servers 1301 and 1302 can communicate with clients 1331 to 1334. The network NW includes, for example, a LAN, a WAN, the Internet, and a cellular phone network.

The server 1302 is an administrating server that manages a group of servers (servers 1321 to 1325) making up a cloud 1320. The client 1331 is a notebook PC, the client 1332 is a desktop PC, the client 1333 is a cellular phone (or smart phone or personal handyphone system (PHS)), and the client 1334 is a tablet terminal. The servers 1301, 1302, and 1321 to 1325 and the clients 1331 to 1334 depicted in FIG. 13 are implemented by, for example, computers having the same functions as those of the portable terminal 300.

As described, according to the portable terminal 300, when the results of a given function cease to be displayed on the display screen, power supply to the peripheral Pj is suspended and power supply to the dummy unit 307 is started. The dummy unit 307 returns the same response signal as the response signal returned by the first peripheral device 102 in response to a control signal from the CPU #i (app Ak) and thereby, emulates the operation of the first peripheral device 102 as a dummy operation.

As a result, unnecessary power consumption by the peripheral Pj for processing a moving image, etc. that is no longer being displayed on the display 104 can be reduced. Thus, the overall power consumption of the portable terminal 300 can be suppressed. The dummy unit 307 returns the same response signal as the response signal returned by the peripheral Pj in response to a control signal from the CPU #i, thereby eliminating any need to modify the app Ak (e.g., modification for synchronization) for controlling the power supply to the peripheral Pj and thus, suppressing increases in the work load on the designer.

According to the portable terminal 300, when display of the given function on the display screen is resumed, power supply to the peripheral Pj is resumed and power supply to the dummy unit 307 is suspended. As a result, power supply to the peripheral Pj can be controlled without hampering seamless operation of the app Ak.

According to the portable terminal 300, the estimated time required for resuming the display of the results of a given function on the display screen can be calculated based on the direction, speed, and acceleration, etc. of a scroll operation by the user. Thus, the time required for display of, for example, a moving image reproduction screen on the display 308 (e.g., estimated moving image display time T) can be estimated.

According to the portable terminal 300, power supply to the peripheral Pj can be started before a point in time obtained by subtracting the overhead time $T_{OH}$ from the point in time at which the estimated moving image display time T has elapsed since the start of the scroll operation. This prevents a case where when display of the given function on the display screen is resumed, the moving image processing, etc. by the peripheral Pj is not in time for display of the given function. Thus, seamless operation of the app Ak is ensured.

The power supply control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply control method comprising:
  detecting that a result of a first function performed by a first device ceases to be displayed on a display screen;
  suspending power supply to the first device and supplying power to a second device, based on a detection of the result ceasing to be displayed;
  calculating, based on given information, a timing for supplying power to the second device, wherein the given information includes any one among scroll information and window action control information; and
  causing the second device to output a response signal to a CPU in response to a control signal from the CPU, wherein the response signal includes an ack signal when a task related to the first function is executed or a nak signal when the task related to the first function fails to execute, wherein the suspending power supply to the first device and supplying power to the second device is based on the response signal.

2. The power supply control method according to claim 1, wherein the response signal is outputted by either one of the first device or the second device.

3. The power supply control method according to claim 1, wherein the calculating of the timing includes calculating the timing by taking into consideration, a timing for giving a power supply instruction.

4. The power supply control method according to claim 1, wherein the scroll information includes any one among a scroll method and scroll speed.

5. The power supply control method according to claim 1, further comprising calculating, based on the given information, a timing for resuming power supply to the first device.

6. A system comprising:
a CPU;
a first peripheral device connected to the CPU via a bus; and
a second peripheral device that is started when the first peripheral device is suspended and responds to a control signal from the CPU by a method by which the first peripheral device responds to the control signal,
wherein the second peripheral device responds to the control signal by outputting a response signal to the CPU, the response signal including an ack signal when a task related to a function performed by the first peripheral device is executed or a nak signal when the task related to the function performed by the first peripheral device fails to execute,
wherein the first peripheral device is suspended and the second peripheral device is started based on the response signal,
wherein the CPU calculates, based on given information, a timing for starting the second peripheral device, the given information including any one among scroll information and window action control information.

7. The system according to claim 6, wherein the second peripheral device includes a first register to which information supplied from the first peripheral device to the CPU is written.

8. The system according to claim 6, wherein the second peripheral device includes a second register for which a channel that is a channel set between the CPU and the first peripheral device is set.

9. The system according to claim 6, wherein the CPU calculates a timing for restarting the first peripheral device.

* * * * *